United States Patent [19]

Richards

[11] 3,955,723

[45] May 11, 1976

[54] ELECTRONIC IGNITION SPARK ADVANCE SYSTEM

[75] Inventor: David W. Richards, San Diego, Calif.

[73] Assignee: Teledyne Industries, Inc., Los Angeles, Calif.

[22] Filed: Nov. 29, 1974

[21] Appl. No.: 528,427

Related U.S. Application Data

[63] Continuation-in-part of Ser. No. 452,933, March 20, 1974, abandoned.

[52] U.S. Cl. .......................... 123/117 R; 123/148 E
[51] Int. Cl.² .................................................. F02P 5/04
[58] Field of Search ...................... 123/117 R, 148 E

[56] References Cited
UNITED STATES PATENTS

| | | | |
|---|---|---|---|
| 3,454,871 | 7/1969 | Nolting | 123/117 R |
| 3,696,303 | 10/1972 | Hartig | 123/148 E |
| 3,738,339 | 6/1973 | Huntzinger et al. | 123/117 R |
| 3,749,073 | 7/1973 | Asplund | 123/117 R |
| 3,757,755 | 9/1973 | Carner | 123/117 R |

Primary Examiner—Charles J. Myhre
Assistant Examiner—Paul Devinsky
Attorney, Agent, or Firm—Ronald W. Reagin

[57] ABSTRACT

An ignition spark advance system is disclosed which includes pulse generating means responsive to rotation of the shaft of an internal combustion engine for generating a first train of pulses including a first reference pulse and a plurality of additional pulses and a second train of pulses indicative of the angular position of the shaft of the engine. Timing means are provided for measuring the passage of a predetermined fixed time period after the occurrence of the first reference pulse in the first train of pulses. The relative spacing of the pulses in the first train of pulses and the relative spacing of the pulses in the second train of pulses are selected to be a function of the fixed time period and of each other such that, for any given engine speed, at substantially the angular position of the shaft of the engine at which firing of the spark plugs is desired for that given engine speed, the sum of the number of pulses in the first train of pulses which occurred during the fixed time period plus the number of pulses which have occurred in the second train of pulses is equal to a fixed number. The system also includes a counter, and a gate means responsive to the timing means for applying to the counter those pulses in the first train of pulses which occur during the predetermined fixed time period. The second train of pulses is also applied to the counter and when the count in the counter reaches the fixed number, the spark plugs in the engine are fired.

9 Claims, 10 Drawing Figures

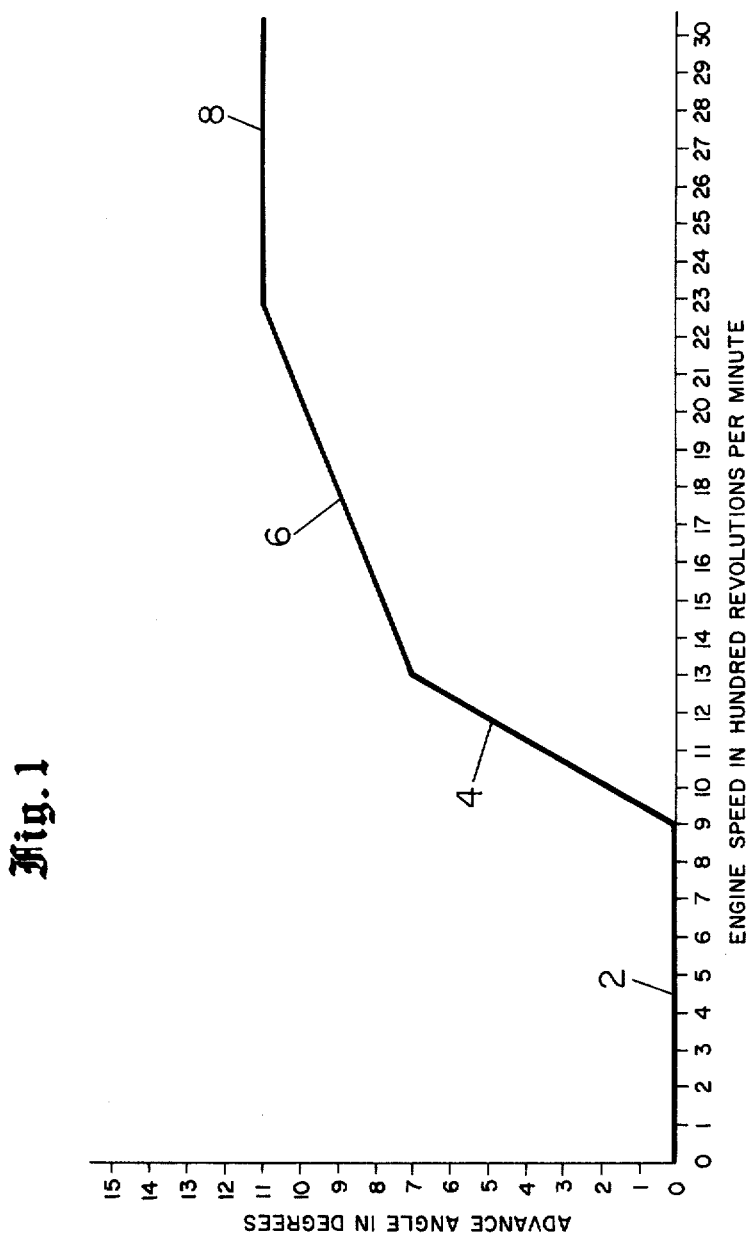

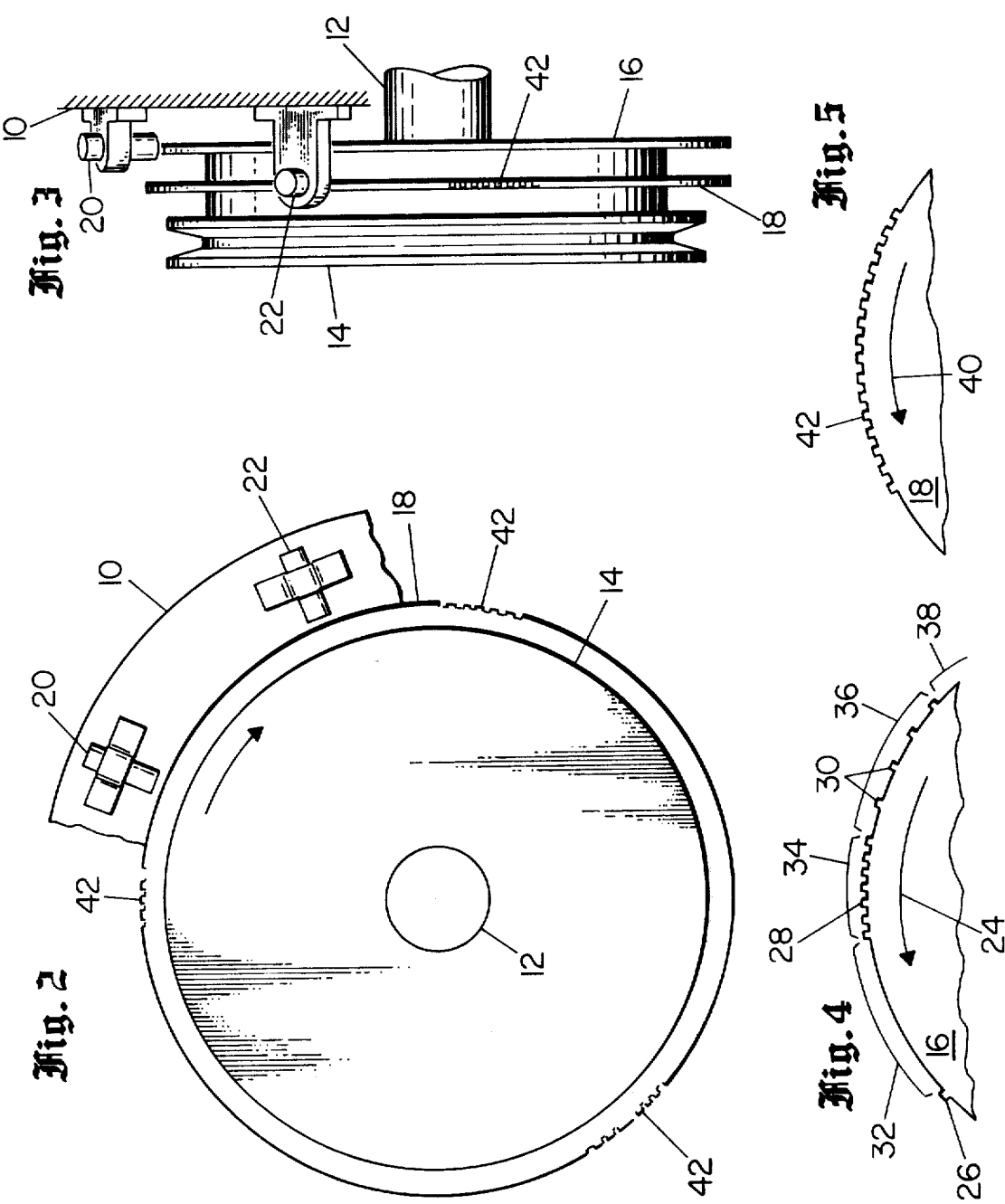

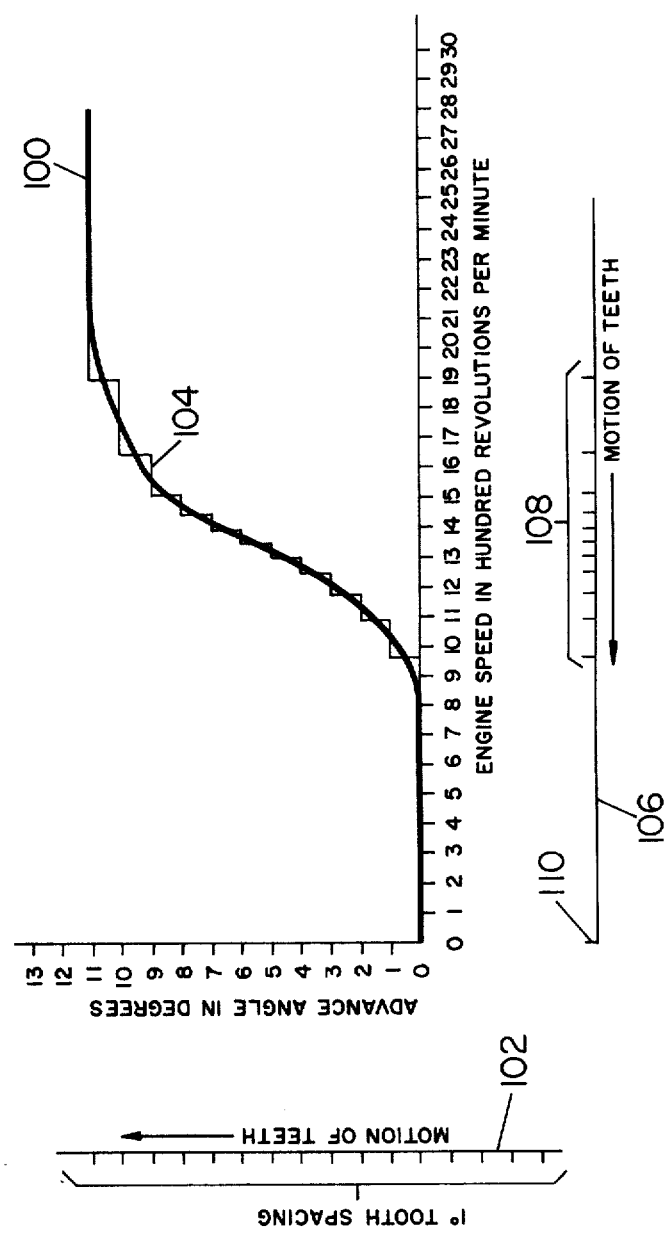

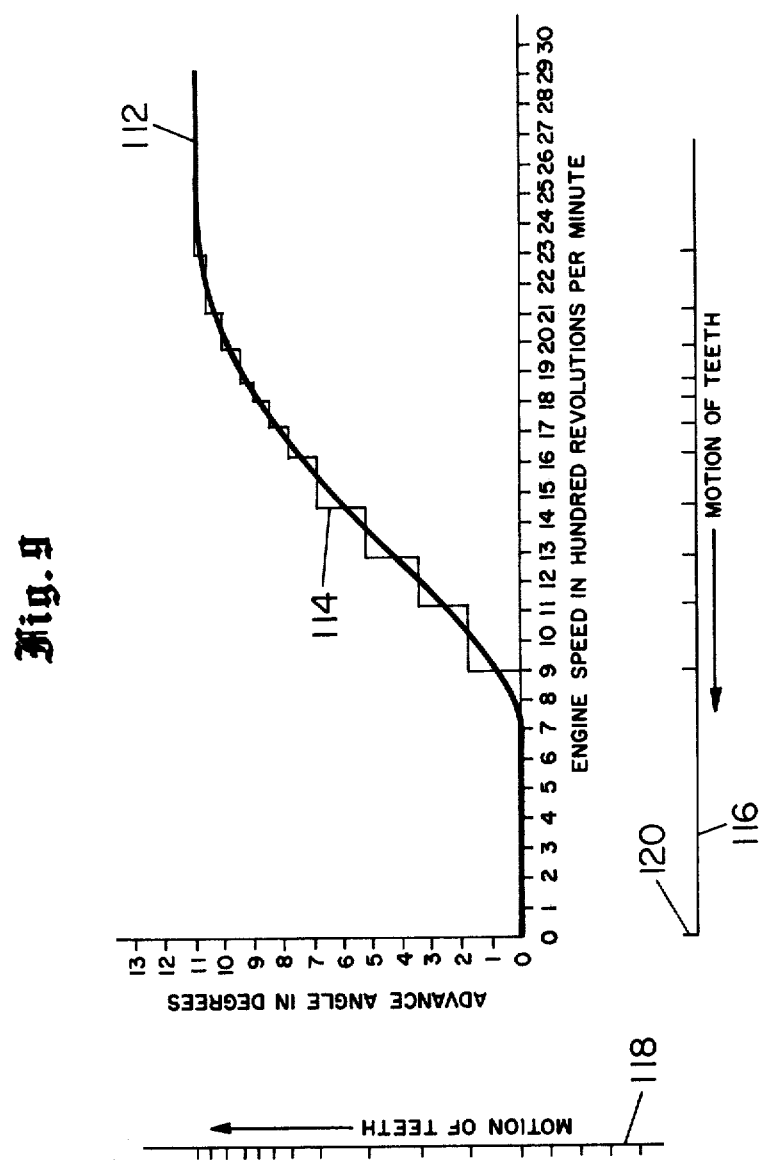

ELECTRONIC IGNITION SPARK ADVANCE SYSTEM

This application is a continuation-in-part of application Ser. No. 452,933, filed Mar. 20, 1974, now abandoned.

This invention is directed to an internal combustion engine electronic ignition spark advance system, and more particularly to such a spark advance system which is formed from a relatively few simple components and which could be easily modified to provide any desired spark advance curve.

In recent years, a great deal of work has been done to develop electronic ignition systems for internal combustion engines to replace the conventional coil breaker point-rotary distributor systems which has been in use for many years. One such system which has been developed has utilized a capacitor to accumulate a charge of electrical energy. At the proper moment in the operation of the engine, the capacitor is discharged through the primary winding of an ignition transformer, and the voltage induced in the secondary winding of the transformer is applied to a conventional spark plug to cause ignition in the cylinders of the engine at the desired time.

One of the principal problems which has been encountered with such electronic ignition systems is the proper timing of the discharge of the capacitor, which obviously determines the timing of the ignition of the fuel in the engine.

It has long been known that the proper timing of the firing of the spark plugs in an internal combustion engine is a function of a number of parameters, including the engine speed. Generally speaking, it is desirable to advance the timing as the engine speed increases, with ignition occurring at approximately top dead center of the piston stroke at low engine speeds and at progressively earlier times at higher engine speeds.

In the conventional prior art ignition systems, ignition spark advance with engine speed was usually achieved by using a breaker cam which was revolved by weights which are rotated by the distributor shaft as the engine turns. However, if such an arrangement were utilized in electronic ignition systems such as were described above, many of the advantages of the electronic ignition system would be obviated.

Thus, the development of electronic ignition systems has also suggested the desirability of developing suitable electronic means for controlling the timing of the ignition in these systems and for providing the desired ignition spark advance with increased engine speed.

If one is not concerned about cost or operating reliability, the problem is not a difficult one at all. The state of the computer art today is such that even simple digital computers operate at speeds much faster than can be achieved by even the fastest internal combustion engines, so that it would be merely necessary to program such a simple computer to provide a desired ignition spark advance curve and then provide the computer with signals indicative of engine speed and instantaneous angular position of the shaft of the engine. The computer could then provide the necessary control signals to the electronic ignition system to provide highly accurate timing of the discharge of the spark plugs in the engine.

However, one of the primary uses of internal combustion engines is in the automobile field, and it is well-known that in that industry, cost and reliability are highly important factors in determining the design of the product. Thus, these factors dictate that the control system use as few and as simple components as is possible to achieve the desired result. These factors also dictate that the system be one which can operate in the relatively adverse environment of an internal combustion engine. Thus, these factors eliminate the use of most conventional small digital computers.

One such control system which has been proposed is described in U.S. Pat. No. 3,696,303. In that system, the internal combustion engine carries on its crank shaft a wheel having a plurality of teeth around its perimeter. Two transducers are provided which generate pulses in response to the passage of these teeth. The pulses so generated are applied through suitable gate circuits to a single counter, which provides an output firing signal when it reaches a predetermined count. Pulses from the first transducer are gated into the counter only during a fixed time period determined by a monostable multivibrator. Thus, the number of pulses applied to the counter from the transducer is a linear function of engine speed, with more pulses being applied at higher engine speeds. The second transducer and the teeth on the wheel are arranged so that pulses are generated in the second transducer only after pulses from the first transducer are no longer gated into the counter. Thus, at higher engine speeds, fewer pulses from the second transducer are required before the counter reaches its predetermined count, firing occurs at an earlier angular position of the crank shaft, and the timing of the engine is advanced as the engine speed increases.

The major disadvantage to the system just described is that the only spark advance curve which can be achieved is a linear one in which the timing advances linearly with engine speed. Most internal combustion engines require a spark advance curve which is non-linear in a compound manner. A typical such spark advance curve might be essentially flat at low engine speeds, relatively steep at intermediate engine speeds, and less steep or even again flat at higher engine speeds. This type of required spark advance curve cannot be achieved by the type of system just described.

A control system which attempts to overcome these problems is described in U.S. Pat. No. 3,738,339. In that system, the internal combustion engine carries on its crank shaft a disc member which has 360 equally spaced teeth about its perimeter. A magnetic sensor is positioned on the engine which is adjacent the disc member, and this sensor detects the passage of these teeth and generates 360 pulses for each revolution of the engine, or one pulse for each degree of revolution of the engine. These signals are applied through a gate to a counter circuit, and another sensor is provided which enables the gate a predetermined number of degrees, such as 60 degrees, before top dead center of the cylinder being controlled. When the gate is so enabled, the pulses which are generated for every degree of revolution of the engine are applied to the counter circuit, and when the counter circuit is counted up to 60, thereby indicating that the desired cylinder is now at top dead center, an output signal from the counter circuit is provided to suitable circuits to initiate ignition of the spark plug.

At this time, the counter resets itself and additonal timing circuits continue to enable the input gate to allow additional pulses from the position sensor to be applied to the counter circuit. Through a rather complex circuit arrangement involving several timing circuits, the length of time the input gate remains enabled is a function of engine speed, with the gate being enabled for longer periods of time at slower engine speeds and for shorter periods of time at higher engine speeds. This results in additional pulses being placed into the counter circuit, with the number of these pulses being a non-linear function of engine speed. Now, on the next revolution, when the input gate is again enabled 60 degrees before top dead center to pass pulses from the position sensor into the counter circuit, it requires fewer pulses to load the counter circuit up to its capacity of 60 pulses to cause ignition of the spark plug, and the spark plug is fired at some point prior to top dead center which is a function of engine speed, and achieves the desired spark advance function.

There are several disadvantages to the spark advance system just described. First, the system requires a relatively large number of components and circuits. This both increases the cost and decreases the reliability, since it is well known that the reliability of any electronic circuit is inversely proportional to the number of components in the circuit. Next, and perhaps more importantly, for a given circuit, the spark advance curve is fixed, and if it is desired to provide a different spark advance curve, the system must be completely charged. Since it is well known that different engines, and even different applications of the same engine might require different spark advance curves, it would be far more desirable if, by some relatively simple adjustment or change of one of the components, the spark advance curve could be changed to a different desired shape. If this could be achieved, a manufacturer could use essentially the same spark advance system for his entire line of products, merely making the necessary adjustments to provide the desired spark advance curve for different engines in the manufacturer's line.

It is accordingly an object of the present invention to provide an improved electronic ignition spark advance system.

It is another object of the present invention to provide an improved electronic ignition spark advance system which is both inexpensive and reliable.

It is yet another object of the present invention to provide an improved electronic ignition spark advance system which utilizes a minimum of components.

It is still another object of the present invention to provide an improved electronic ignition spark advance system which can be easily modified to provide any desired spark advance curve.

Briefly stated, and in accordance with the present invention, an ignition spark advance system is provided for controlling the firing of spark plugs in an internal combustion engine in which the desired spark advance curve is a non-linear function of engine speed. The system includes pulse generating means responsive to rotation of the shaft of the engine for generating a first train of pulses including a first reference pulse and a plurality of additional pulses in which the pulses have a first predetermined relative spacing and a second train of pulses indicative of the angular position of the shaft of the engine relative to a predetermined angular position in which the pulses have a second predetermined relative spacing. Timing means are provided for measuring the passage of a predetermined fixed time period after the occurrence of the first reference pulse in the first train of pulses. The first predetermined relative spacing of the pulses in the first train of pulses and the second predetermined relative spacing of the pulses in the second train of pulses is selected to be a function of the fixed time period measured by the timing means and of each other such that, for any given engine speed, at substantially the angular position of the shaft of the engine at which firing of the spark plugs is indicated by the spark advance curve for that given engine speed, the sum of the number of pulses in the first train of pulses which occurred during the fixed time period measured by the timing means plus the number of pulses which have occurred in the second train of pulses is equal to a fixed number. The system also includes a counter, and a gate means responsive to the timing means for applying to the counter those pulses in the first train of pulses which occur during the predetermined fixed time period. The second train of pulses is also applied to the counter and when the count in the counter reaches the fixed number, the spark plugs in the engine are fired.

In the presently preferred embodiment of the invention the spark advance curve includes a plurality of successive sections each having a respective predetermined slope. The relative spacing of the pulses in the first train of pulses is non-linear such that the train of pulses includes a plurality of successive sections each corresponding to a respective one of the sections in the spark advance curve, with the pulses in each section of the train of pulses having a repetition rate which is proportional to the slope of the corresponding section of the spark advance curve, and to the speed of the engine. The pulses in the second train of pulses are then linearly spaced, and indicate the angular position of the shaft of the engine relative to a predetermined angular position, such as top dead center of one of the cylinders in the engine.

For a complete understanding of the invention, together with an appreciation of its other objects and advantages, please refer to the following detailed description of the attached drawings, in which:

FIG. 1 is a typical spark advance curve which might be desired for an internal combustion engine;

FIG. 2 is a front view of a timing ring assembly for use in the presently preferred embodiment of the invention;

FIG. 3 is a side view of FIG. 2;

FIGS. 4 and 5 are enlarged views of a portion of the timing rings of FIGS. 2 and 3;

FIG. 8 shows a different spark advance curve, and illustrates how it is achieved with the presently preferred embodiment of the invention;

FIG. 9 shows yet another spark advance curve, and illustrates generically how the relative spacing of the pulses in the first and second train of pulses is a function of the fixed time period and of each other, and how these relative spacings may be determined.

Figure 6:
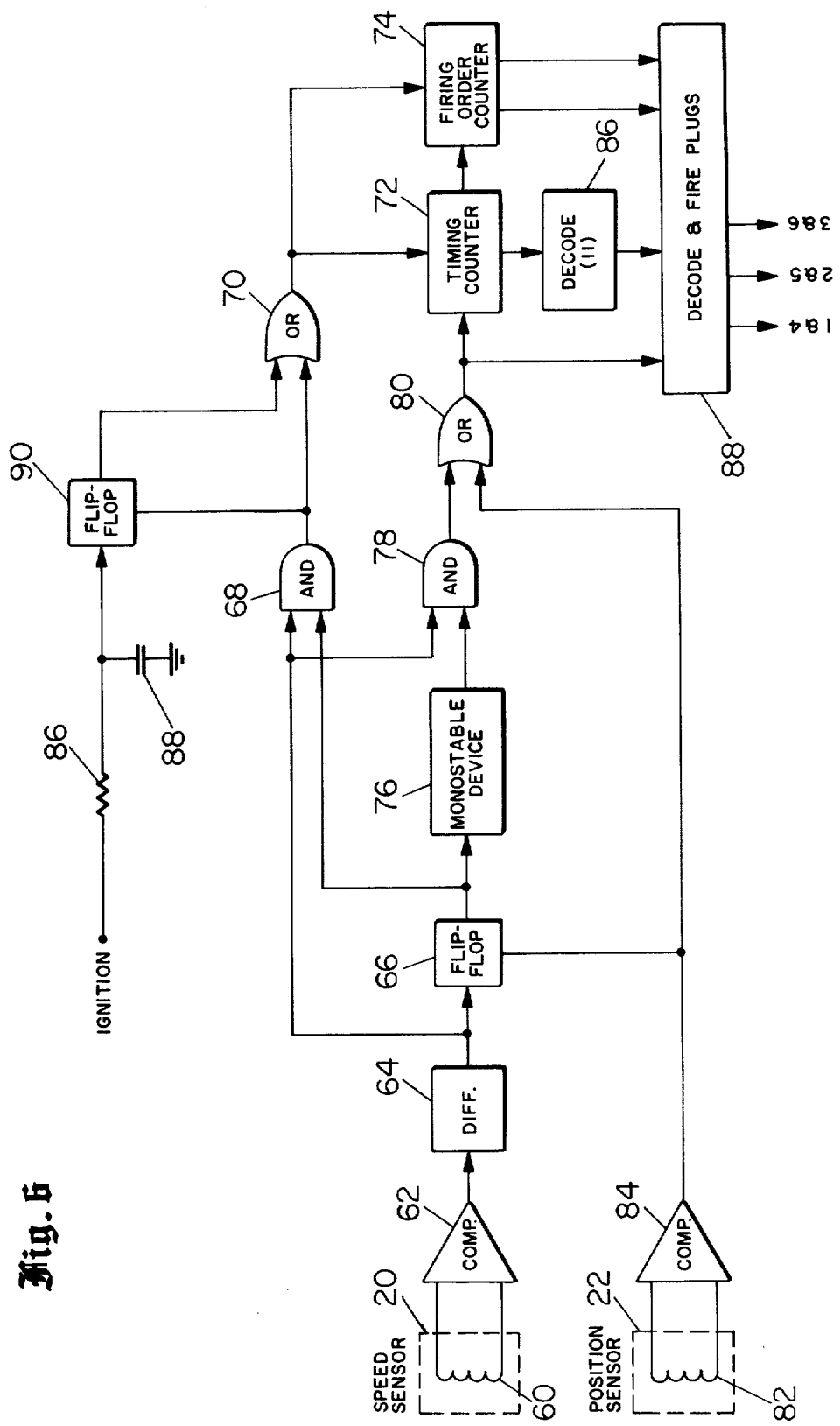
FIG. 6 is a schematic block diagram of the electronic portion of the system.

FIG. 1 shows a typical spark advance curve for an internal combustion engine in which particular advance angles of firing the spark plug are desired for particular engine speeds. In the shown spark advance curve, it is assumed that it is desired to fire the spark plug at top dead center, or at an advance angle of zero degrees, for all engine speeds between 0 and 900 revolutions per minute, to fire the spark plug at an advance angle of 7 degrees before top dead center at an engine speed of 1300 revolutions per minute, with a linear slope of the advance curve between 900 and 1300 revolutions per minute, with a linear slope of the advance curve between 1300 and 2300 revolutions per minute, and to continue firing the engine at an advance angle of 11° before top dead center for all engine speeds in excess of 2300 revolutions per minute. Of course, this particular advance curve is shown merely to illustrate how, by using the present invention described in detail below, any desired advance can be achieved, and the invention is in no way limited to this particular shown advance curve.

The advance curve of FIG. 1 may be considered to be made up of four successive sections each having a respective predetermined slope, with the first section 2 having a flat or zero slope and lying between the engine speeds zero revolutions per minute and 900 revolutions per minute, the second section 4 having the maximum slope and lying between the engine speeds 900 revolutions per minute and 1300 revoltions per minute, the third section 6 being of intermediate slope and lying between the engine speeds 1300 revolutions per minute and 2300 revolutions per minute and the fourth section 8 again being a flat slope and covering all engine speeds above 2300 revolutions per minute.

In accordance with one of the features of the present invention, pulse generating means are provided which are responsive to rotation of the shaft of the engine to generate two trains of digital pulses. In the presently preferred embodiment of the invention, the first train of pulses has a plurality of successive sections, each corresponding to a respective one of the sections 2, 4, 6 and 8 of the spark advance curve of FIG. 1, with the pulses in each section of the first train of pulses having a repetition rate which is proportional to the slope of its corresponding section of the spark advance curve. The second train of pulses which is generated by the pulse generating means is indicative of the angular position of the shaft of the engine relative to a predetermined angular position of the shaft, such as the angular position of the shaft corresponding to top dead center of the particular cylinder in question. FIGS. 2, 3, 4 and 5 show the presently preferred manner for generating these two trains of pulses.

FIG. 2 is a front view of a timing ring assembly for generating the above-described trains of pulses and FIG. 3 is a side view of the timing ring assembly of FIG. 2. The following description is of FIGS. 2 and 3 simultaneously.

FIGS. 2 and 3 show the forward portion of an internal combustion engine 10 having an output shaft 12. A conventional V-belt drive pulley 14 is mounted on the outer most portion of the shaft 12. In accordance with the preferred embodiment of the present invention, first and second timing discs or rings 16 and 18 respectively, are mounted on the shaft 12 between the engine 10 and the pulley 14. It is noted that the first timing ring 16 is not visible in FIG. 2, since it lies entirely behind the second timing ring 18.

As is described in more detail in connection with FIGS. 4 and 5 below, each of the timing rings 16 and 18 includes a plurality of teeth members each of which corresponds to one of the pulses in the first and second train of pulses to be generated. A first sensor 20 is provided which is mounted on the engine 10 and which is positioned adjacent the perimeter of the first timing ring 16 to sense the passage of the teeth on timing ring 16 past first sensor 20. Similarly, a second sensor 22 is provided which is mounted on the engine 10 and positioned adjacent the perimeter of second timing ring 18 to sense the passage of teeth on the second timing ring 18 passing the second sensor 22. In the preferred embodiment of the invention, the teeth on the timing rings 16 and 18 are formed from magnetic materials, and the sensors 20 and 22 are magnetic sensors. However, as is obvious to one having ordinary skill in the art, equivalent other means for generating the first and second trains of pulses could be provided using optical sensors or the like.

Continuing now the description of the drawings, the first timing ring 16 and first sensor 20 generate the above-described first train of pulses. As was noted above, the first train of pulses includes a plurality of successive sections each corresponding to a respective one of the sections 2, 4, 6 and 8 of the spark advance curve of FIG. 1, with the pulses in each section of the train of pulses having a repetition rate which is proportional to the slope of the corresponding section of the spark advance curves. The manner in which this is achieved is best illustrated by FIG. 4, which is a rear view of a portion of the perimeter of the first timing ring 6. Since FIG. 4 is a rear view of the first timing ring 16, the timing ring 16 is rotated by the output shaft 12 in the direction shown by the arrow 24. As is shown by FIG. 4, the perimeter of the timing ring 16 includes a plurality of teeth thereon each of which, when it passes the sensor 20, causes a pulse to be generated in sensor 20. The teeth on timing ring 16 include a first tooth 26, a second group of seven teeth 28, and a third group of four teeth 30. The spacing of these teeth are in the manner shown and defined four sections along the perimeter of ring 16. The first section 32 lies between the first tooth 26 and the first one of the teeth 28, the second section 34 is formed by the seven teeth 28, the third section 36 is formed by the four teeth 30, and the fourth section 38 is formed by the portion of the ring 16 after the final one of the teeth 30. The section 32 corresponds to the section 2 of the spark advance curve of FIG. 1, the section 34 corresponds to the section 4 of the spark advance curve, the section 36 corresponds to the section 6 of the spark advance curve and the section 38 corresponds to the section 8 of the spark advance curve. It will be observed that the frequency of the teeth on each of the sections of the timing ring 16 corresponds to the slope of the respective related portion of the timing curve of FIG. 1. Thus, in the sections 32 and 38 of the timing ring 16, which correspond to the sections 2 and 8 respectively of the timing curve, there are no teeth, since the slope of these sections of the timing curve is flat or zero. Similarly, the spacing of the teeth 28 in the section 34 of timing ring 16 is the closest spacing of any of the teeth, and corresponds to the maximum slope of the section 4 of the spark advance curve, and the spacing of the teeth 30 in section 36 of timing ring 16 is an intermediate spacing and corresponds to the intermediate slope of the section 6 of the spark advance curve. Thus, when the internal combustion engine is running at an essentially constant speed, the teeth 26, 28 and 30 will pass the sensor 20 and generate a first train of pulses having a plurality of successive sections each corresponding to a respective one of the sections of the spark advance curve, with the pulses in each section of the first train of pulses having a repetition rate which is proportional to the slope of the corresponding section of the spark advance curve.

As will be more apparent from the description of FIG. 6 below, in the preferred embodiment, the total number of teeth 26, 28 and 30 is a function of various portions of the electronic components of the system described in FIG. 6 below, with the first tooth 26 merely generating a reset signal and the combined number of teeth 28 and 30 being one less than the count necessary to be stored in timing counter 72 to cause firing of the spark plug. Further, as will be apparent from the description of FIG. 6, the total spacing of the teeth 26, 28 and 30 is a function of the time period of the monostable multivibrator 76, and this total spacing can be varied if the time period of monostable multivibrator 76 is correspondingly varied.

The second train of pulses described above is generated by teeth on the second timing ring 18 passing the second sensor 22. Again, in the preferred embodiment of the invention, these teeth are formed of magnetic material and the sensor 22 is a magnetic sensor, but of course, any related form of position indicator and sensor could be used instead.

FIG. 5 shows a back view of the second timing ring 18, which is driven by the output shaft 12 in the direction shown by the arrow 40. As is shown in FIG. 5, a plurality of teeth 42 are positioned about its perimeter to indicate the angular position of the shaft 12 relative to some predetermined angular position, preferably the angular position of the shaft 12 corresponding to top dead center of the particular cylinders corresponding to these teeth 42. As each of the teeth 42 pass the sensor 22, a pulse is generated therein which indicates that the teeth so passed the sensor 22, and which thus indicates the instantaneous angular position of shaft 12. In the preferred embodiment of the invention, the teeth 42 are spaced one degree apart around the perimeter of second timing ring 18, and thus a pulse is generated in sensor 22 for every degree of rotation of shaft 12, at least during that portion of rotation when the teeth 42 are adjacent the sensor 22. The location of the leading one of the teeth 42 is selected to correspond to the maximum advance angle for which the system is designed to provide. In the case of the advance curve described in FIG. 1 above, the location of the advance tooth 42 corresponds to 11° before top dead center of the corresponding cylinder.

As is described in more detail below in connection with the description of FIG. 6, in the preferred embodiment of the invention, the total number of the teeth 42 is equal to the total capacity of the timing counter 72 of FIG. 6.

As is best shown in FIG. 2, the second timing ring 18 includes a plurality of sections of teeth 42. The number of such sections is equal to one-half the number of the cylinders of the engine. In the shown embodiment, it is assumed that the engine is a six cylinder engine. Accordingly, three such sections of teeth 42 are shown in FIG. 2. Those skilled in the art are aware that in such engines, the pistons travel up and down together in pairs, with two pistons being at top dead center at the same time. However, in a four cycle engine, only one of the cylinders is delivering power after being at top dead center, with the other cylinder being in the process of exhausting its combustion products from the preceding revolution. Thus, the spark plugs in both cylinders can be fired simultaneously, with one cylinder then igniting and delivering power, while the spark in the other cylinder is superfluous. Those skilled in the art are aware that this arrangement not only saves total components, it also greatly simplifies the system by eliminating the necessity to determine which of the pair of cylinders is then ready to deliver power and which is in the exhaust section of its cycle.

In the portion of the invention described thus far, the first series of pulses is generated in the sensor 20, and this train of pulses may be thought of as digital signals indicative of the instantaneous engine speed. Similarly, the second train of pulses are generated in the sensor 22, and this train of pulses may be thought of as a digital signal indicative of the instantaneous angular position of the output shaft 12 of the engine. Therefore, to provide an antecedent basis for description of the following FIG. 6, sensor 20 is hereinafter referred to as the speed sensor, and sensor 22 is hereinafter referred to as the position sensor.

FIG. 6 illustrates a functional block diagram of the electronic portion of the system according to the present invention. Speed sensor 20 includes a pickup coil 60 in which a pulse is generated every time one of the teeth 26, 28 or 30 on first timing ring 16 passes adjacent the sensor 20. This output pulse is applied to a voltage comparator 62, which has a fixed threshold voltage, and whose output signal is a substantially square wave which is applied to the differentiater 64. Differentiater 64 has as its output signal a narrow pulse corresponding to the center of the related tooth on timing ring 16.

This output signal of differentiater 64 is applied to the input terminal of a flip-flop 66 and also to one of the input terminals of $^{AND}$-gate 68. As is described in more detail hereinafter, the flip-flop 66 was previously set into its on or high state, and its output signal is also applied to the other input terminal of AND-gate 68. Thus, since AND-gate 68 has input signals on both of its input terminal, it provides an output signal to OR-gate 70, which in turn provides an output signal to timing counter 72 and firing order counter 74, resetting both of these elements to their initial or zero state.

In this manner, the first pulse generated in speed sensor 20, which is to say the pulse generated by the passage of tooth 26 past speed sensor 20, assures that timing counter 72 and firing order counter 74 are reset to their initial or zero states.

The initial pulse generated in speed sensor 80 by tooth 26 also resets flip-flop 66 to its low state. When this occurs, there is no longer an input signal on the second input terminal of AND-gate 68, and thereafter AND-gate 68 blocks any other pulses which may be applied to it by the generating of pulses in speed sensor 20 by the other teeth 28 and 30 on first timing ring 16.

When flip-flop 66 is so reset, it also triggers monostable device 76, which may be a monostable multivibrator, into its unstable state. When this occurs, the output signal from monostable device 56 is applied to the input terminal of AND-gate 78, whose other input terminal receives any output signals from differentiater 64. Now, as long as monostable device 76 remains in its unstable state, AND-gate 78 is enabled and passes any pulses applied to this other input terminal, which is to say any output pulses from differentiater 64 which are caused by the passage of any of the teeth 28 and 30 on timing ring 16 past the speed sensor 20. The output signals from AND-gate 78 are then applied to OR-gate 80, whose output is applied to the input terminal of timing counter 72. Thus, for as long as monostable device 76 is in its unstable state, any pulses generated by the passage of the teeth 28 and 30 past the speed sensor 20, which is to say the above-described first train of pulses, are applied to the input terminal of timing counter 72, in which they are counted and stored. Upon the expiration of the unstable period of monostable device 76, it returns to its stable state, thereby blocking AND-gate 78 and preventing the passage of any additional pulses from speed sensor 20 to timing counter 72.

The spacing between the teeth on first timing ring 16 (See FIG. 4) and the duration of the unstable period of monostable device 76 are selected so that, to achieve the spark advance curve of FIG. 1, if the engine is running at precisely 900 revolutions per minute, the section 32 of first timing ring 16 passes under sensor 20 precisely during the time period that monostable device 76 is in its unstable state. Thus, for any engine speed less than 900 revolutions per minute, no pulses generated by speed sensor 20 will be applied to timing counter 72 during the unstable period of monostable device 76. The teeth 28, seven in number in the shown embodiment, are equally spaced throughout the section 34 of first timing ring 16, and the length of this section 34 is such that, if the engine is running at 1300 revolutions per minute, both the sections 32 and 34 of timing ring 16 pass under the speed sensor 20 during the time the monostable device 76 is in its unstable state. Thus, if the engine is running at a speed between 900 and 1300 revolutions per minute, a portion or all of the teeth 28 will pass under the speed sensor 20, depending upon the speed of the engine. Similarly, the length of the section 36 of timing ring 16 is selected such that, if the engine is running 2300 revolution per minute, all of the sections 32, 34 and 36 will pass under the speed sensor 20 during the time period that the monostable device 76 is in its unstable state, and if the engine is running at a speed between 1300 and 2300 revolutions per minute, all of the teeth 28 and a portion of the teeth 30 will pass under the speed sensor 20, depending upon the exact speed of the engine. If the engine is running at a speed faster than 2300 revolutions per minute, all of the teeth 28 and 30 will pass under the speed sensor 20, thereby generating all eleven pulses in the first train of pulses, and no additional pulses will be generated, regardless of how much faster than 2300 revolutions per minute the engine is turning, and these eleven pulses will all be applied to the timing counter 72 before monostable device 76 once again assumes its stable state and blocks AND-gate 78, thereafter blocking the output pulses from speed sensor 20 being applied to timing counter 72.

In this manner, there is applied to timing counter 72 a number of pulses which is indicative of the engine speed and which is also a function of the desired shape of the spark advance curve for the engine.

Similarly, the passage of the teeth 42 on second timing ring 18 (See FIG. 5) generates a second train of pulses in a pickup coil 82 in position sensor 22. These pulses are applied to a voltage comparator 84, which again provides a train of square output pulses indicating the passage of the teeth 42 past the position sensor 22. As was noted above, there are sixteen teeth 42, each spaced one degree apart, with the first tooth being located eleven degrees before top dead center of the related cylinder. Thus, the output pulses from voltage comparator 84 indicate the angular position of the output shaft 12 in one degree increments from 11° before top dead center to five degrees after top dead center.

This second train of pulses is applied to the reset terminal of flip-flop 66 and also to the other input terminal of OR-gate 80. Thus, the first one of these pulses resets flip-flop 66 into its off or low state, thereby enabling this portion of the circuit to again respond to the next occurrence of the above-described first train of pulses.

The second train of pulses is also passed through OR-gate 80 to the input terminal of timing counter 72, at which place they are added to any pulses which were previously placed in the timing counter 72 from speed sensor 20. Whenever the timing counter 72 reaches a predetermined count, the spark plugs in the associated cylinder are to be fired. In this described embodiment, this predetermined count is twelve. In the described embodiment this is accomplished by a decode device 82, which provides an output signal whenever the timing counter reaches a count of eleven, or one less than the desired firing count. The output signal of unit 82 enables a decode and fire plugs unit 84 to provide a firing signal to the spark plugs of the desired pair of cylinders upon the occurrence of the next pulse in the second train of pulses, which is also applied by the OR-gate 80 to the decode and fire plugs unit 84. The proper pair of cylinders is determined by firing order counter 74, which was initially reset in the manner described above, and which is advanced by output signals from timing counter 72 which indicate to it that the desired number of input pulses has been received by timing counter 72. Firing order counter 74 and decode 82 together enable decode and fire plugs unit 84 to provide an output firing signal on one of its three output lines upon the occurrence of the twelfth output pulse through OR-gate 80.

As was noted above, in the preferred embodiment, the combined number of teeth 28 and 30 on first timing ring 16 is equal to one less than the predetermined count at which the spark plugs are fired, or in this embodiment a total of eleven teeth, since the spark plugs are fired on the twelfth count. Also, the preferred number of teeth 42 on second timing ring 18 is equal to the total capacity of timing counter 72. In the shown embodiment, timing counter 72 is a four-stage binary counter, having a total capacity of a count of sixteen, and sixteen teeth 42 are shown on second timing ring 18. Thus, by this arrangement, it is assured that, when the engine is running in excess of 2300 revolutions per minute, the teeth 28 and 30 have caused a generation of pulses which have loaded the timing counter 72 to the point where the next pulse applied to it, which is to say the first pulse generated by the teeth 42 on second timing ring 18, causes the spark plugs to fire. Also, by providing sixteen teeth 42 on second timing ring 18, the timing counter 72 is restored to its initial count, which is to say the count entered into it by the first train of pulses while the monostable device 76 was in its unstable state, every time one of the set of teeth 42 pass under the position sensor 22, regardless of whether this initial count was zero, eleven or any number in between. Thus, the count indicative of engine speed can be obtained once per revolution of the engine and retained in the system, even though the count indicative of the angular position of the shaft of the engine is obtained a number of times per revolution equal to half the number of cylinders in the engine. However, obviously, if it is desired to do so, the engine speed information could also be updated a plurality of times per revolution merely by providing a plurality of sets of teeth properly spaced and positioned about the first timing ring 16. However, obviously it is desirable to position the speed sensor 20 and position sensor 22 relative to the teeth which they count on first timing ring 16 and second timing ring 18 respectively so that no tooth on first timing ring 16 is adjacent to speed sensor 20 at the same time that one of the teeth on second timing ring 18 is adjacent to the position sensor 22.

An initializing circuit is provided to assure that all of the components of the circuit are reset to the proper position when the ignition is initially started. This initializing circuit comprises a resistor 86, a capacitor 88 and a flip-flop 90, connected in the manner shown in FIG. 6. The resistor 86 is connected to the ignition circuit of the engine such that, when the ignition circuit is first switched on, the capacitor 88 causes the voltage to go momentarily low at the input of flip-flop 90, thereby placing it in its set or on condition. The output of this flip-flop 90 is applied to the OR-gate 70 previously described, whose output signal resets timing counter 72 and firing order counter 74 to their initial or zero state. Flip-flop 90 is thereafter reset to its initial or low state by the first output signal from AND-gate 68, previously described.

FIG. 7 again shows the spark advance curve of FIG. 1, and illustrates how this desired spark advance is achieved by the system just described in connection with FIGS. 2 through 6.

Figure 7:
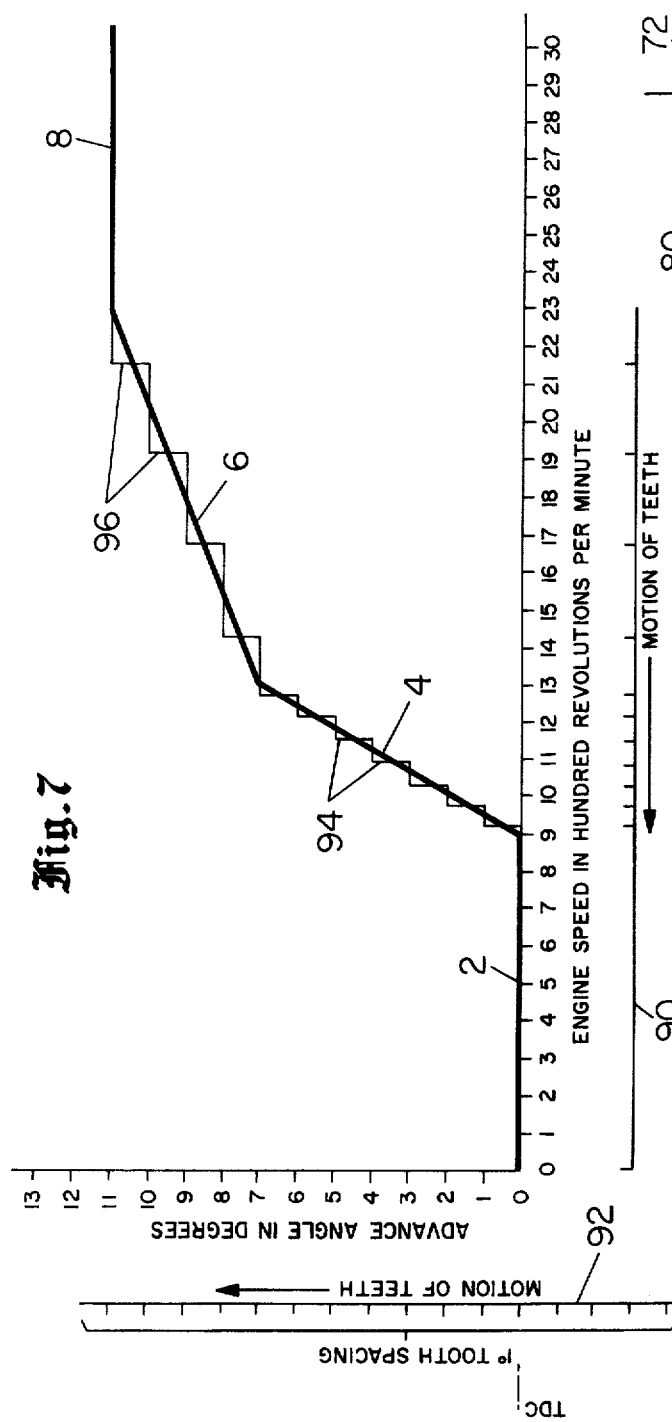
FIG. 7 shows the spark advance curve of FIG. 1 again and illustrates how it is achieved with the presently preferred embodiment of the invention.

The line 90 drawn under the graph of FIG. 7 schematically represents the spacing of the teeth 26, 28 and 30 on the first timing ring 16 (see FIG. 4) and thus also represents the generation of the first train of pulses when these teeth pass the speed sensor 20. The eleven marks shown on line 90 are shown under the corresponding engine speeds at which the tooth corresponding to the mark passes speed sensor 20 immediately prior to the conclusion of the unstable state of monostable device 76. Thus, at that engine speed, the pulse generated by that tooth will be allowed by the monostable device 76 and the AND-gate 78 to enter the timing counter 72. Similarly, the line 92 represents schematically the teeth 42 on the second timing ring 14 (see FIG. 5) and thus also represents the generation of the 16 pulses in the second train of pulses when these teeth pass the position sensor 22. The position of the marks on line 92 corresponds to the angular position of the output shaft at which these teeth are positioned, and thus at which the corresponding pulses are generated. As was described in connection with FIG. 6 above, ignition of a spark plug occurs when a total count of 12 is achieved by timing counter 72, whether these pulses came from the first train of pulses or the second train of pulses. Thus, for engine speeds between 0 and 900 revolutions per minute, no pulses in the first train of pulses reach timing counter 72, because none of the teeth 28 or 30 are sensed by speed sensor 20 during the unstable state of monostable device 76, and ignition occurs after counting twelve pulses in the second train of pulses, which is to say at top dead center or at an advance angle of 0°. Thus, the timing curve in this engine speed range is the section 2 shown in FIG. 7 and in FIG. 1.

As is schematically indicated by FIG. 7, for engine speeds between 900 revolutions per minute and 1300 revolutions per minute, at least a portion of the teeth 28 are sensed by speed sensor 20 during the unstable state of monostable device 76 and a corresponding portion of the first seven pulses in the second train of pulses reaches timing counter 72. The actual firing now occurs as is shown by the stair-step section 94 of FIG. 7, which obviously closely approximates the desired section 4 of the timing curve. Similarly, for engine speeds between 1300 and 2300 revolutions per minute, actual firing occurs along the stair-step portion 96 of FIG. 7, which closely approximates the section 6 of the timing curve. Finally, for engine speeds above 2300 revolutions per minute, the firing occurs at an advance angle of 11°, which is along the section 8 of the timing curve.

In the invention as thus far described, it has been assumed that the desired spark advance curve has been formed from a plurality of successive straight line sections each having a constant slope, such as was shown in the graphs of FIGS. 1 and 7. Of course, the invention is equally applicable to achieve or approximate a desired spark advance curve which is a continuous smooth function, rather than a succession of broken lines. FIG. 8 illustrates the manner in which the above-described presently preferred embodiment of the invention can be used to achieve a spark advance curve which is a smooth continuous curve, and also illustrates the manner in which a designer can easily determine the proper positioning of the teeth on the first and second timing rings 16 and 18 to achieve any desired spark advance curves.

In FIG. 8, the desired spark advance curve is the smooth continuous curve 100. Of course, it is well recognized that a smooth continuous curve can be considered mathematically the equivalent of an infinite plurality of connected straight lines of infinitely small size and it is this equivalency that is used in the present invention to achieve a spark advance curve which approximates the curve 100.

Again, as in the case of the previously described Figures, the second timing ring 18 is formed with 16 teeth thereon, each spaced 1 degree from the adjacent teeth. Thus, as in the case of FIG. 7, the line 102 and the sixteen marks thereon schematically represent the generation of the sixteen pulses in the second train of pulses when these teeth pass the position sensor 22. The position of the marks on the line 102 corresponds to the angular position of the output shaft at which these teeth are positioned, and thus at which the corresponding pulses are generated.

A stair-step line 10/4 is shown superimposed upon the smooth continuous curve 100, with each horizontal segment of the line 104 corresponding to a respective one of the first twelve teeth on the second timing ring 18, which are schematically represented by the top twelve marks on the line 102. The vertical segments of the stair-step line 104 are drawn between the horizontal segments so that the stair-step line 104 approximates the curve 100 as closely as possible.

The line 106 drawn under the graph of FIG. 8 schematically represents the spacing of the teeth on the first timing ring 16, and thus also represents the generation of the first train of pulses when these teeth pass the speed sensor 20. The eleven marks 108 shown on line 106 are drawn from and positioned directly beneath the vertical segments of the stair-step line 104, and the positioning of these marks 108 determines the position of the final eleven teeth on the first timing ring 16 relative to the first tooth on the timing ring 16 which produces the first reference pulse, indicated by the mark 110 on the line 106.

Since the eleven marks 108 shown in line 106 are shown under the corresponding engine speeds at which the tooth corresponding to the respective mark passes speed sensor 20 immediately prior to the conclusion of the unstable state of monostable device 76, this information can readily be used by a designer to calculate the proper position of the teeth on the first timing ring 16. The position in degrees of a tooth on the first timing ring 16 corresponding to a particular one of the marks 108 relative to the tooth which generated the first reference pulse corresponding to the mark 110 is given by the simple expression $T\omega$, where T is the time period in seconds measured by the monostable device 76 and $\omega$ is the engine speed in degrees per second corresponding to the engine speed directly above the particular mark 108 on line 106. Obviously, the engine speed in revolutions per minute can be converted into engine speed in degrees per second by multiplying by 360° per revolution and dividing by 60 seconds per minute, or in effect multiplying by 6.

Thus, in the manner just described, the smooth continuous curve 100 may be considered to be formed from a plurality of successive sections (in the described embodiment, eleven such sections) each having a respective predetermined slope, and the first train of pulses generated by the passage of the teeth on first timing ring 16 past the speed sensor 20 may be considered to be formed of a plurality of eleven successive sections each having only one pulse therein, and each corresponding to a respective one of the sections of the smooth, continuous spark advance curve 100.

In the embodiments of the invention described thus far, the desired non-linear spark advance curve is achieved by generating a first train of pulses which are non-linearly spaced in a corresponding manner, while the second train of pulses are all linearly spaced relative to each other. The desired result can also be achieved with linear spacing of the pulses on the first train of pulses and non-linear spacing of the pulses in the second train of pulses, or by having non-linear spacing of the pulses in both trains of pulses. What is important is that the relative spacing of the pulses in the first and second trains of pulses are functions of the fixed time period measured by the monostable device 76 and of each other, such that, for any given engine speed, at substantially the angular position of the shaft of the engine at which the firing of the spark plugs is indicated by this spark advance curve for that given engine speed, the sum of the number of pulses in the first train of pulses which occurred during the fixed time period measured by the monostable device 76 plus the number of pulses which have occurred in the second train of pulses is equal to the fixed number at which the counter 72 and the decode and firing circuits 86 and 88 cause the spark plugs to fire.

FIG. 9 is an illustration of a timing curve generally similar to FIGS. 7 and 8, described above, and indicates how the desired relative spacing can be achieved even though both of the trains of pulses have relatively non-linear spacing. In FIG. 9, the 112 represents the desired spark advance curve. A stair-step line 114 is superimposed upon the line 112, and as in the case of FIGS. 7 and 8 described above, this stair-step 114 represents the actual spark advance curve which is generated by the embodiment represented graphically by FIG. 9 to approximate the desired spark advance curve. However, the steps along stair-step line 114 are not uniform along either axis, since in this embodiment it is desired to have greater accuracy of approximation at the higher engine speed portions of the curve 112, at the sacrifice of lesser accuracy at the engine speeds of approximately 700 1700 revolutions per minute.

Again, the lines 116 and 118 are provided, and the marks on line 116 are formed by projecting downwardly the vertical segments of the line 114. These marks, together with the mark 120 which represents the first reference pulse, schematically represent the position of the twelve teeth on the first timing ring 16, and the physical location of each teeth can easily be calculated in the manner described in connection with FIG. 8 above.

Similarly, the top twelve marks on the line 118 are the projections of the horizontal segments of the stair-step line 114, and these twelve marks represents schematically the location of the first twelve teeth on the second timing ring 18. The physical location of each of these teeth relative to top dead center of the particular cylinder and piston can be read directly off of the vertical axis of the graph of FIG. 9.

It is noted that the bottom four marks on the line 118 correspond to the remaining four teeth on the second timing ring 18, so that this timing ring 18 still has 16 teeth, equal to the capacity of the timing counter 72, for the reasons described above.

Thus, in the embodiment of the invention illustrated graphically by FIG. 9, the relative spacing of the pulses in both the first and second trains of pulses in non-linear, but still the requirement is met that these relative spacings, in combination with the time period measured by the monostable device 76, achieve the desired result that, for any given engine speed, at substantially the angular position on the shaft of the engine at which firing of the spark plugs is indicated by the spark advance curve for that given engine speed, the sum of the number of pulses in the first train of pulses which occurred during the fixed time period measured by the monostable device 76 plus the number of pulses which have occurred in the second train of pulses is equal to the desired fixed number which causes firing of the spark plugs.

From the above description of the invention, and particularly from FIGS. 7, 8 and 9 just described, it is seen that the desired spark advance curve is achieved by proper spacing of the teeth on the timing rings 16 and 18, which determines the number and spacing of the pulses in the above-described first and second trains of pulses. Obviously, any desired spark advance curve can be achieved or approximated by changing the number and spacing of the teeth on the timing rings 16 and 18. Thus, by merely changing these components, the system just described can be used to generate any desired spark advance curve, and by making this simple change, a manufacturer may use the same system throughout his line, or even change the spark advance curve of an existing engine merely by changing these components.

Figure 10:
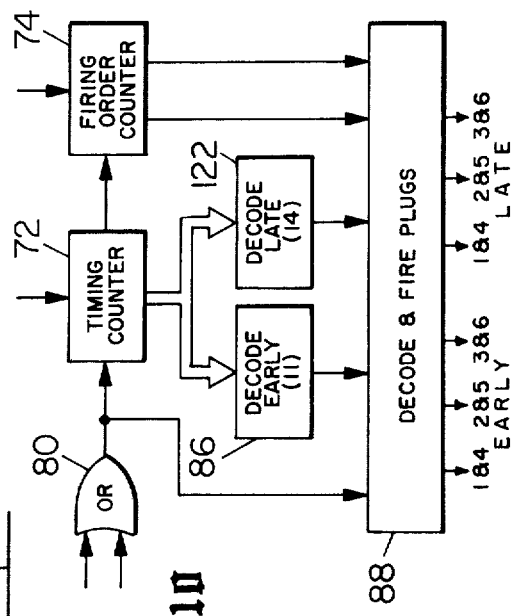
FIG. 10 is a schematic block diagram of an additional embodiment of the invention.

In some internal combustion engines, it is useful to use two spark plugs per cylinder. For instance, such an arrangement is sometimes found in aircraft engines, in industrial engines, and in rotary engines. In these engines, it is desirable to fire the second spark plug a fixed number of degrees of rotation after firing the first spark plug in the cylinder, but to still provide a spark advance function for both spark plugs as a function of engine speed. FIG. 10 shows a modification of FIG. 6 which can be used with engines which have two spark plugs per cylinder. In FIG. 10, the same reference numerals are used to identify the like components of FIG. 6.

In FIG. 10, it is assumed that it is desired to fire the second spark plug in the cylinder three degrees of rotation after firing the first spark plug in the cylinder. To achieve this, a second decode unit 122 is provided which responds to a count three numbers higher than the count to which the first decode unit 82 responds, and thus responds to an angular position of the output shaft of the engine three degrees later. In the shown embodiment the decode unit 122 thus responds to a count of fourteen in the timing counter 72. When this count is achieved in timing counter 72, decode unit 122 enables the decode and and fire plugs unit 84 to provide an ignition output to the second or late bank of spark plugs. Now, the next output signal from OR-gate 82, when it is applied to decode and fire plugs unit 84, causes the generating of such an ignition firing signal to the proper late spark plugs on the fifteenth count as determined by firing order counter 74, previously described.

While the invention is thus disclosed and the preferred embodiment described in detail, together with several modifications of that embodiment, it is not intended that the invention be limited in scope to this shown embodiment. Instead many modifications will occur to those skilled in the art which lie within the scope of the invention. For example, in some applications it might be desirable to generate either or both of the first and second trains of pulse by providing suitable markings on the fly wheel of the engine and by providing suitable sensors to detect the passing of these marks. Accordingly, it is intended that the invention be limited in scope only by the appended claims.

What is claimed is:

1. In an internal combustion-engine including an output shaft, spark plugs and an ignition-spark advances for controlling the firing of the spark plugs in which the desired spark advance curve is a non-linear function of engine speed, the improvement comprising, in combination:

pulse generating means responsive to rotation of the output shaft of the engine for generating a first train of pulses including a first reference pulse and a plurality of additional pulses in which the pulses have a first predetermined relative spacing and a second train of pulses indicative of the angular position of the shaft of the engine relative to a predetermined angular position in which the pulses have a second predetermined relative spacing, in which at least one of the first predetermined relative spacing of the pulses in the first train of pulses and the second predetermined relative spacing of the pulses in the second train of pulses is a non-linear relative spacing;

timing means for measuring the passage of a predetermined fixed time period after the occurrence of the first reference pulse in the first train of pulses; the first predetermined relative spacing of the pulses in the first train of pulses and the second predetermined relative spacing of the pulses in the second train of pulses being a function of the fixed time period measured by the timing means and of each other such that, for any given engine speed, at substantially the angular position of the shaft of the engine at which firing of the spark plugs is indicated by the spark advance curve for that given engine speed, the sum of the number of pulses in the first train of pulses which occurred during the fixed time period measured by the timing means plus the number of pulses which have occurred in the second train of pulses is equal to a fixed number;

a counter;

gate means responsive to the timing means for applying to the counter those pulses in the first train of pulses which occur during the predetermined fixed period;

means for applying the second train of pulses to the counter; and means responsive to the count in the counter reaching a predetermined count equal to the fixed number for firing the spark plugs in the engine.

2. The ignition spark advance system of claim 1 in which the pulse generating means comprises means for generating a first train of pulses including a first reference pulse and a plurality of additional pulses whose number is equal to one less than the predetermined count in the counter which fires the spark plugs in the engine.

3. The ignition spark advance system of claim 1 in which the pulse generating means comprises means for generating a second train of pulses whose number is equal to the capacity of the counter.

4. The ignition spark advance system of claim 1 in which the pulse generating means comprises:

means for generating the first train of pulses including a first ring which is driven in rotation by the shaft of the engine and which includes a plurality of teeth about at least a sector of its perimeter, with the number and spacing of the teeth corresponding to the number and spacing, respectively, of the pulses in the first train of pulses, and a first sensor which is mounted at a fixed location radially spaced from the first ring, and means for generating the second train of pulses including a second ring which is driven in rotation by the shaft of the engine and which includes a plurality of sectors equal in number to one half of the number of cylinders in the engine, each of the sectors including a plurality of spaced teeth whose number is equal to the number of pulses in the second train of pulses, and a second sensor which is mounted at fixed locations radially spaced from the second ring.

5. The ignition spark advance system of claim 4 in which the teeth are made of magnetic material and the sensor are magnetic flux sensors.

6. The ignition spark advance system of claim 4 in which the first and second sensors are mounted relative to the first and second rings, respectively, such that no tooth on the first ring is adjacent the first sensor at any angular position of the shaft of the engine at which any tooth on the second ring is adjacent the second sensor.

7. The ignition spark advance system of claim 1 which further comprises means responsive to activation of the ignition circuit of the engine for resetting the counter.

8. The ignition spark advance system of claim 1 in which the timing means comprises:

a monostable multivibrator; and means responsive to the first pulse of the first train of pulses for placing the monostable multivibrator in its unstable state.

9. The ignition spark advance system of claim 1 in which the desired spark advance curve includes a plurality of successive sections each having a respective predetermined slope and the pulse generating means includes means for generating a first train of pulses having a plurality of successive sections each corresponding to a respective one of the sections of the spark advance curve, with the pulses in each section of the first train of pulses having a repetition rate which is proportional to the slope of the corresponding section of the spark advance curve and to the engine speed.

* * * * *